US010479317B1

(12) United States Patent
Savich

(10) Patent No.: US 10,479,317 B1
(45) Date of Patent: Nov. 19, 2019

(54) APPARATUS AND METHOD FOR SEAT BELT WRAP

(71) Applicant: Daniel L. Savich, Lowell, IN (US)

(72) Inventor: Daniel L. Savich, Lowell, IN (US)

( * ) Notice: Subject to any disclaimer, the term of this patent is extended or adjusted under 35 U.S.C. 154(b) by 0 days.

(21) Appl. No.: 16/046,022

(22) Filed: Jul. 26, 2018

Related U.S. Application Data

(60) Provisional application No. 62/656,494, filed on Apr. 12, 2018.

(51) Int. Cl.
*B60R 22/00* (2006.01)

(52) U.S. Cl.
CPC ........ *B60R 22/00* (2013.01); *B60R 2022/006* (2013.01)

(58) Field of Classification Search
CPC .......................... B60R 2022/006; B60R 22/00
USPC .............................. 297/482, 227; 2/460, 461
See application file for complete search history.

(56) References Cited

U.S. PATENT DOCUMENTS

| | | | | |
|---|---|---|---|---|
| 3,291,528 A * | 12/1966 | Sencabaugh | ............ | B60R 22/02 2/338 |
| 3,306,662 A * | 2/1967 | Finnigan | ................. | B60R 22/00 297/482 |
| 4,693,495 A * | 9/1987 | LaPointe | ................. | B60R 22/00 280/808 |
| 4,786,080 A * | 11/1988 | Jay | ......................... | B60R 22/14 280/808 |
| 4,929,027 A * | 5/1990 | Beauvias, II | ........... | B60R 22/14 280/808 |
| 5,165,752 A * | 11/1992 | Terry | ......................... | B62J 1/18 297/202 |
| 6,322,149 B1 * | 11/2001 | Conforti | ............... | B60R 22/024 297/482 |
| 6,322,150 B1 * | 11/2001 | Harper | .................... | B60R 22/00 297/468 |
| 8,146,946 B1 * | 4/2012 | Emond | .................... | B60R 22/30 280/801.1 |
| 2011/0254344 A1 * | 10/2011 | Freeman | ................ | A62B 35/00 297/482 |

FOREIGN PATENT DOCUMENTS

| | | | | | |
|---|---|---|---|---|---|
| DE | 3501747 A1 * | 9/1986 | ............. | B60R 22/00 |
| DE | 3542393 A1 * | 6/1987 | ............. | B60R 22/00 |
| FR | 1368324 A  * | 7/1964 | ............. | B60R 22/00 |
| GB | 1565644 A  * | 4/1980 | ............. | B60R 22/00 |

* cited by examiner

*Primary Examiner* — Milton Nelson, Jr.
(74) *Attorney, Agent, or Firm* — Rick B. Yeager

(57) ABSTRACT

A plurality of spaced-apart hook and loop fasteners are secured to the inside edge of a fabric to permit folding and installing the wrap on a seat belt. The fasteners are pivot points to permit an effective compression or "scrunching" of the wrap when not in use. The fasteners permit the wrap to move in an accordion-like fashion to expand for use or compress when not in use. Elongated foam stopper are provided along the top and bottom edges to fit around the seat belt causing light pinch points to keep the wrap in place when in use, and to permit the wrap location to be easily adjusted for user comfort. When the seat belt wrap is no longer in use and retracted, the stopper prevents the seat belt wrap from getting caught in the vehicles seat belt retracting system.

4 Claims, 5 Drawing Sheets

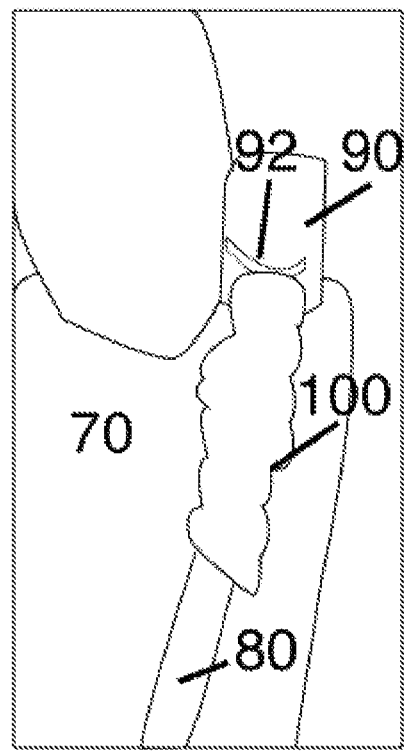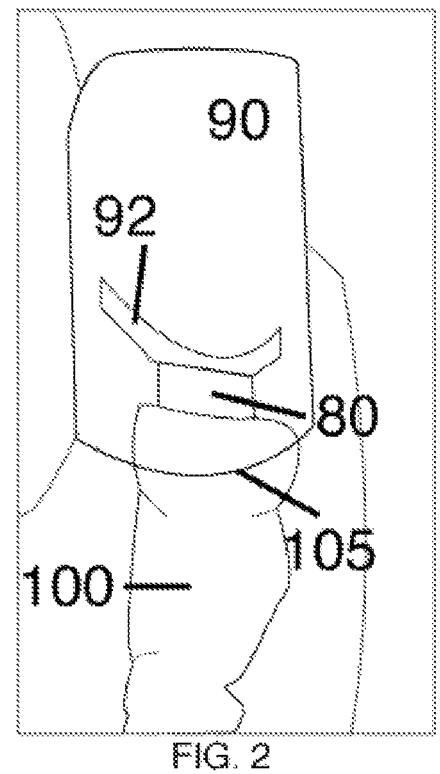

APPARATUS AND METHOD FOR SEAT BELT WRAP

This US non-Provisional Patent Application is related to U.S. Provisional Patent Application No. 62/656,494 filed by applicant on Apr. 11, 2018, and claims priority from that application.

BACKGROUND

Field of Invention

The current invention relates to an apparatus and method for a seat belt cover, and more particularly to a fabric cover for the shoulder strap portion of a seat belt.

SUMMARY OF INVENTION

Applicant was uncomfortable with the seat belt shoulder strap digging into his neck and shoulder areas. Applicant purchased a prior art seat belt cover, but found it to be cumbersome to use. That experience prompted applicant to design a more comfortable, stylish and user-friendly seat belt wrap.

In one example, the seat belt wrap comprises a solid piece of fabric with sewn side, top, and bottom edges. A plurality of spaced-apart fasteners, such as hook and loop elements or snaps are secured inside edge of the fabric. The fasteners permit the wrap to be installed and removed. The fasteners also serve as pivot points to permit an effective compression or "scrunching" of the wrap when not in use. By placing the fasteners in various positions on the fabric, the seat belt wrap can move in an accordion-like fashion to expand for use or compress when not in use.

In one example, the top and bottom portions of the seat belt wrap include an elongated stopper such as foam, cardboard, or plastic that fits around the seat belt causing a light pinch point at the top and bottom to keep the wrap in place when in use. The stopper allows the seat belt wrap to be easily adjusted to the exact position that is most comfortable for the user. When the seat belt wrap is no longer in use and retracted, the stopper prevents the seat belt wrap from getting caught in the vehicles seat belt retracting system.

The seat belt wrap can be used in any seat in the vehicle and is attached to the seat belt. The seat belt wrap fits around the seatbelt and is secured by the fasteners that are attached to the fabric. When in use the seat belt wrap is placed to comfort for the user and when not in use, it is compressed out of the way.

BRIEF DESCRIPTION OF THE DRAWINGS

FIG. 1 is a front perspective view of a first example seat belt cover installed on a seat belt where the seat belt cover is in a first compressed configuration.

FIG. 2 is a detailed front view of a portion of the first example seat belt cover in a compressed configuration.

FIG. 4B shows and example foam stopper.

DESCRIPTION OF EMBODIMENT

Figure 4A:
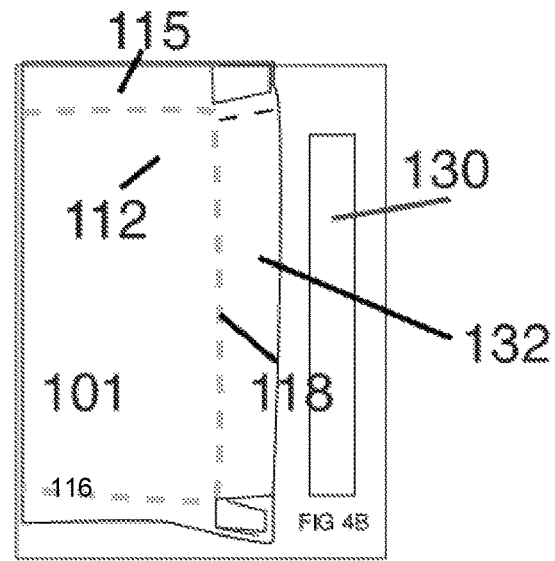
FIG. 4A is a top view of the outside surface of an example seat belt cover in an unfolded orientation.

The following element numbers referenced in the drawings are provided for convenience.
seat 70
seat belt 80
seat belt return housing 90
seat belt return housing slot 92
seat belt wrap 100, 101
upper end portion 105
lower end portion 106
material 110
outside surface 112
inside surface 114
top stitch 115
first side stitch 116
second side stitch 117
fasteners 120
hook and loop fasteners 122, 123
hook portions 122a-122f loop
portions 123a-123f
snaps 124
upper stopper 130
upper stopper pocket 132
lower stopper 136
lower stopper pocket 138

FIG. I is a front perspective view of an example seat belt wrap 100 installed on a seat belt where the seat belt wrap is in a first compressed configuration. In this example, a typical automotive seat 70 has a seat belt with shoulder strap portion 80. The seat belt is shown in a retracted orientation, where a portion of the belt is retracted through slot 92 of a seat belt return housing 90.

A seat belt wrap 100 is shown positioned over a portion of the seat belt shoulder strap portion 80. In this figure, the seat belt wrap 100 is shown in a compressed orientation in proximity to the seat belt return housing 90.

FIG. 2 is a detailed front view of a portion of the example seat belt wrap of FIG. 1. In this example, the upper end portion 105 of the seat belt wrap 100 is shown in proximity to the seat belt return housing 90. The seat belt wrap 100 is outside of the slot 92 in the seat belt return housing 90. As described below, the upper end portion 105 of the seat belt wrap 100 includes an upper stopper which permits the seat belt to slide relative the seat belt cover, but which is larger than the seat belt cover slot 92 in order to prevent the seat belt cover from retracting into the seat belt cover slot.

In an example use, a driver or passenger sits in the seat 70, and pulls the seat belt buckle, thereby withdrawing a portion of the seat belt shoulder strap portion 80 through the seat belt return housing 90. After the the driver or passenger buckles the seat belt, the seat belt wrap is stretched to an uncompressed orientation so that it is positioned over the driver or passenger shoulder and torso. In one example, the lower end portion 106 of the seat belt wrap has a lower stopper which loosely binds the seat belt wrap to a portion of the shoulder strap. When the shoulder strap is released and retracted, the lower stopper is pulled toward the seat belt return housing 90 so that the seat belt wrap is compressed as shown in FIG. 3.

Figure 3:
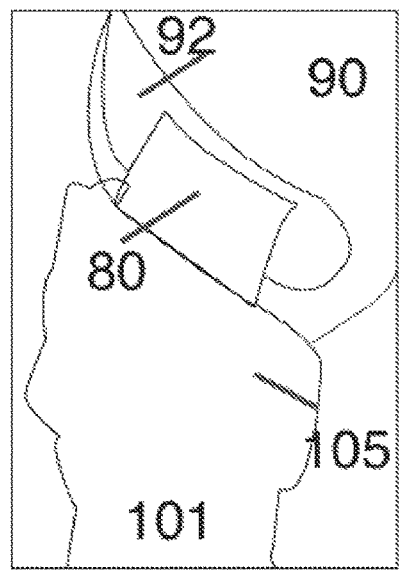
FIG. 3 is a detailed front view of a portion of a second example seat belt cover IO I in a compressed configuration.

FIG. 3 is a detailed front view of an upper portion of a second example seat belt wrap 101. In this example, the upper end portion 105 of the seat belt wrap 101 is shown in proximity to a seat belt return housing 90. The seat belt wrap 100 is outside of slot 92 in the seat belt return housing 90.

FIG. 4A is a top view of the outside surface 112 of an example seat belt wrap 101 in an unfolded orientation showing a first side stitch 115, and a a first side stitch 116, and a stopper pocket stitch 118. The stopper pocket switch 118 secures a foam stopper in a stopper pocket 132.

FIG. 4B shows and example foam stopper 130. In this example, the resiliency of the foam holds the seat belt wrap against the seat belt, but permits the user to easily slide the wrap; and permits the seat belt to retract through the seat belt wrap.

Figure 5:
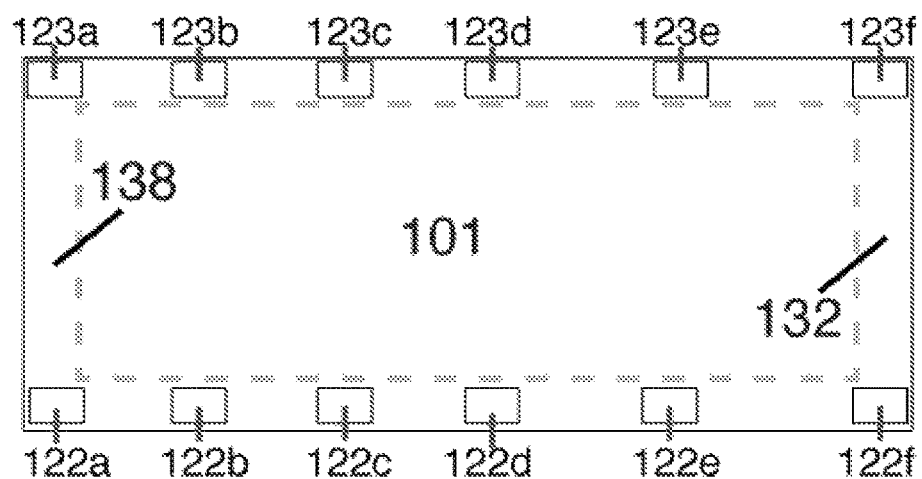
FIG. 5 is a detailed front view of a portion of the second example seat belt cover of FIG. 3.

FIG. 5 is a top view of the outside surface 112 of an example seat belt wrap 101 in an unfolded orientation showing a top stitch 115, a first side stitch 116, and a a second side stitch 117. In this example, hook portions 122a-122f of a hook and loop fastener are placed on along a first side edge, and loop portions 123a-123f are placed at the same spacings along the the second side edge.

Figure 6A:
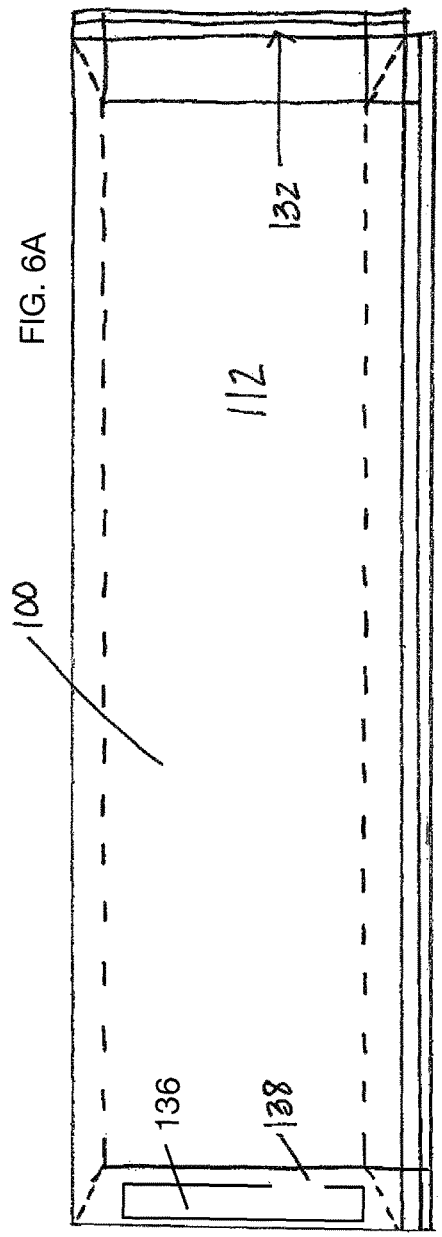
FIG. 6A is a top view of the outside surface of an example seat belt cover in an unfolded orientation.

FIG. 6A is a top view of the outside surface 112 of an example seat belt wrap in an unfolded orientation showing an upper stopper pocket 132 and a lower stopper pocket 138.

Figure 6B:
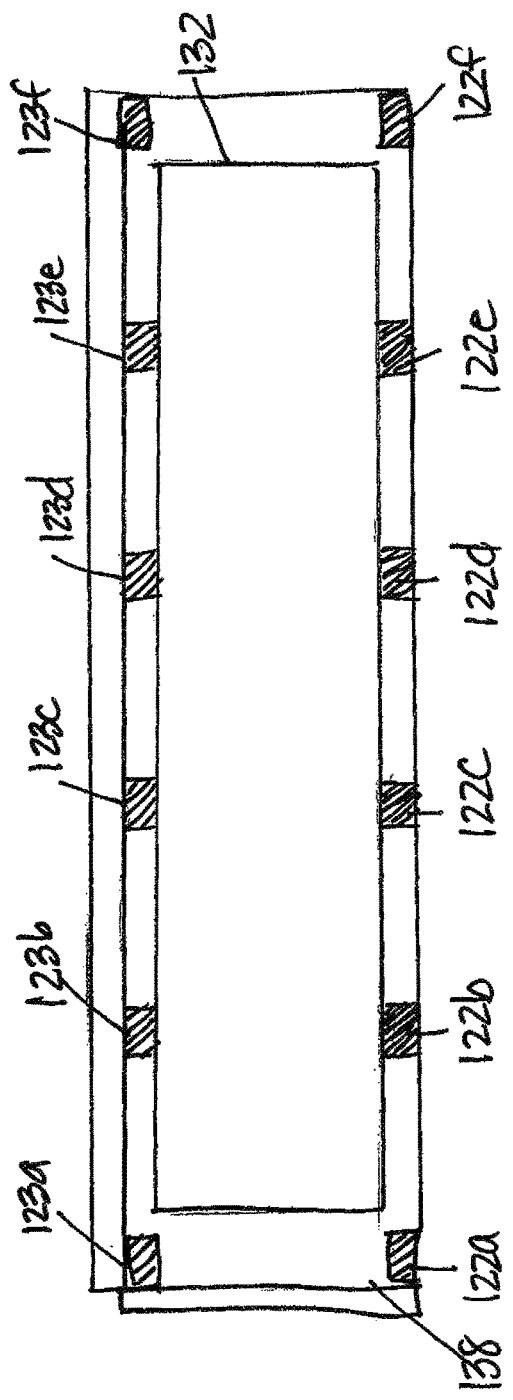
FIG. 6B is a top view of the inside surface of an example seat belt cover of FIG. 6B man unfolded orientation.

FIG. 6B is a top view of the inside surface 114 of the example seat belt wrap of FIG. 6A in an unfolded orientation. In this example, six sets of spaced apart hook and loop elements are attached to the inside surface. The hook portions 122a-122f are placed on along a first side edge, and loop portions 123a-123f are placed at the same spacings along the the second side edge. The wrap is attached to the seat belt by folding the inside surface over the belt and engaging the hook and loop elements. In other examples, snaps or other fasteners may be used.

Figure 7:
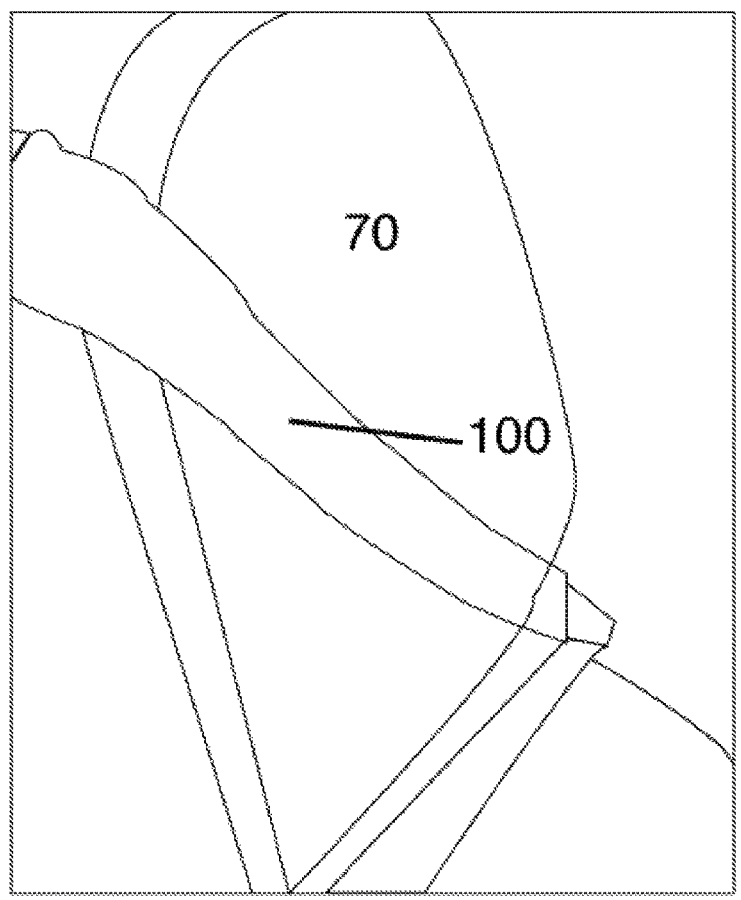
FIG. 7 is a front perspective view of the first example wrap extended on a seat belt shoulder strap.

FIG. 7 is a front perspective view of the first example wrap 100 extended on a seat belt shoulder strap. In this example, the extended length of the wrap cover the shoulder strap.

Example Construction

The following example construction describes making a seat belt cover from a fabric material, where the seat belt cover has top and bottom stoppers.

The construction of the seat belt cover starts with any piece of fabric. This fabric can be any length or width where the length is longer than the width. The outer edges of the material are sewn-stitched on all 4 sides as shown in FIGS. 1 and 2.

At this point, take the stopper 130 such as a strip of foam, vinyl, rubber, cardboard, or plastic, and place this at the top and bottom pieces of the material. Fold over the fabric so that each end holds a stopper inside stopper pocket 132 or 138 as shown in FIG. 5. Sew-stitch the close the stopper pocket across the width of the top and bottom of the fabric.

Take the long length of the fabric, and fold over the side edges. Sew-stitch the side edges along the length of the fabric on each side.

Attach fasteners along the side edges of the of the fabric. In the example of FIGS. 5 and 6, six pieces of hook and loop material are used, so that the hook portions are attached to one side edge, and the loop portions are attached to the other side edge directly across from the hook portions. In other examples, snaps or other fasteners maybe used.

In other examples, the stopper may be placed on the outside of the fabric. This is done by folding over the edges of the material and sewing-stitching them together.

Stoppers

The stopper has two functions. A stopper holds the belt cover in place when in use. When the seat belt is not in use, the stopper is larger and wider than the retracting slot, and restricts the belt wrap from being caught in the belt retraction mechanism.

The stoppers at the upper and lower portions of the wrap squeeze the wrap tight enough to stay in place while in use, but have the ability to slide to a preferred position.

Compression

The use of spaced-apart fasteners permits and facilitates an accordion-like compression and expansion of the seat belt cover.

With the fasteners being placed in a staggering position it allows the cover to scrunch together. This happens when the top stopper is pushed toward the bottom stopper. The staggered fasteners slide on the belt together, and push the fabric out with a billowing effect, thus shortening the wrap length.

It is to be understood that the specific embodiments and examples described above are by way of illustration, and not limitation. Various modifications may be made by one of ordinary skill, and the scope of the invention is as defined in the appended claims.

What is claimed is:

1. A seat shoulder belt wrap comprising
an elongated fabric having a longitudinal axis comprising
an inside surface,
an outside surface,
a first side edge,
a second side edge,
an upper end edge,
a lower end edge;
a plurality of spaced apart first hook and loop fastening elements affixed to the inside surface in proximity to the first side edge;
a plurality of spaced apart second hook and loop fastening elements affixed to the inside surface in proximity to the second side edge, each second fastening element positioned across from a corresponding first fastening element and configured to mate with the corresponding first fastening element when the fabric is folded lengthwise; such the plurality of first and second spaced apart first hook and loop fastening elements are configured to permit the elongated fabric to compress in proximity to a shoulder strap retraction housing; and
an upper elongated foam stopper element affixed perpendicular to the longitudinal axis of the elongated fabric, in proximity to the upper end edge of the fabric.

2. The seat belt wrap of claim 1 wherein
the elongated foam upper stop element is secured in a pocket perpendicular to the longitudinal axis of the elongated fabric.

3. The seat belt wrap of claim 1 further comprising
an elongated foam lower stop element in a pocket perpendicular to the longitudinal axis of the elongated fabric, the pocket positioned in proximity to the lower end of the fabric.

4. A method of using a seat shoulder belt wrap, the method comprising providing a seat shoulder belt wrap comprising
an elongated fabric comprising
an inside surface,
an outside surface,
a first side edge,
a second side edge,
an upper end edge, and
a lower end edge;
a plurality of first hook and loop fastening elements affixed to the inside surface in proximity to the first side edge, a plurality of second hook and loop fastening elements affixed to the inside surface in proximity to the second side edge, each second hook and loop fastening element positioned across from a corresponding first hook and loop fastening element and configured to mate with a first fastening element when the fabric is folded lengthwise, and an upper elongated foam stopper element affixed perpendicular to the longitudinal axis of the elongated fabric, to a first end of the folded fabric;

attaching the seat shoulder belt wrap to a seat belt shoulder strap by folding the seat shoulder belt wrap over a portion of the shoulder strap and securing the plurality of corresponding first and second hook and loop fastening elements;

unfastening the seat shoulder_belt at a first time so that the shoulder strap is retracted and so that the wrap is compressed in proximity to a shoulder strap retraction housing; and fastening the seat belt at a second time and adjusting the wrap.

\* \* \* \* \*